(12) United States Patent
Wu et al.

(10) Patent No.: US 11,411,683 B2
(45) Date of Patent: Aug. 9, 2022

(54) TECHNIQUES FOR INTERFERENCE MANAGEMENT IN MILLIMETER WAVE COMMUNICATIONS SYSTEMS

(71) Applicant: QUALCOMM Incorporated, San Diego, CA (US)

(72) Inventors: Zhibin Wu, Sunnyvale, CA (US); Sudhir Kumar Baghel, Hillsborough, NJ (US); Junyi Li, Chester, NJ (US); Libin Jiang, Seattle, WA (US); Kapil Gulati, Dover, DE (US); Shailesh Patil, San Diego, CA (US); Tien Viet Nguyen, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/259,878

(22) Filed: Jan. 28, 2019

(65) Prior Publication Data

US 2019/0238273 A1     Aug. 1, 2019

Related U.S. Application Data

(60) Provisional application No. 62/623,444, filed on Jan. 29, 2018.

(51) Int. Cl.
   *H04L 1/16*            (2006.01)
   *H04W 74/08*         (2009.01)
   (Continued)

(52) U.S. Cl.
   CPC .......... *H04L 1/1671* (2013.01); *H04B 7/0857* (2013.01); *H04W 8/005* (2013.01);
   (Continued)

(58) Field of Classification Search
   CPC ........ H04L 1/16; H04W 74/08; H04W 72/04; H04W 72/08; H04B 7/08
   See application file for complete search history.

(56) References Cited

U.S. PATENT DOCUMENTS

| 9,609,527 B1 * | 3/2017 | Tailor .................... H04B 7/024 |
| 2003/0157908 A1 * | 8/2003 | Dalal .................... H04B 1/525 |
| | | 455/129 |

(Continued)

OTHER PUBLICATIONS

International Search Report and Written Opinion—PCT/US2019/015679—ISA/EPO—dated Apr. 23, 2019.

*Primary Examiner* — Kevin C. Harper
*Assistant Examiner* — Henry Baron
(74) *Attorney, Agent, or Firm* — Holland & Hart LLP

(57) ABSTRACT

Described are methods for interference detection and management in a millimeter wave communications system. A V2X communications system may support interference management procedures that comprise scheduling a system wide training interval in a transmission timeslot, suspending traffic transmissions on a link in the communications system during the training interval to perform training on the link, and resuming traffic transmissions on the link if interference is not detected during the training interval. Interference management procedures may also include receiving at a node, unique parameters transmitted from another node in a communication system during a discovery stage, determining whether interference will occur at the node based on the received unique parameters, and suspending transmissions to and from the node if it is determined interference will occur at the node.

24 Claims, 11 Drawing Sheets

(51) Int. Cl.
*H04B 7/08* (2006.01)
*H04W 72/04* (2009.01)
*H04W 72/08* (2009.01)
*H04W 8/00* (2009.01)
*H04W 76/28* (2018.01)
*H04B 7/06* (2006.01)
*H04W 4/44* (2018.01)

(52) U.S. Cl.
CPC ....... *H04W 72/046* (2013.01); *H04W 72/082* (2013.01); *H04W 74/085* (2013.01); *H04W 76/28* (2018.02); *H04B 7/0695* (2013.01); *H04W 4/44* (2018.02)

(56) References Cited

U.S. PATENT DOCUMENTS

| | | | |
|---|---|---|---|
| 2012/0087341 A1* | 4/2012 | Jang | H04W 72/1215 370/331 |
| 2015/0304924 A1* | 10/2015 | Chen | H04W 36/22 370/332 |
| 2016/0269087 A1 | 9/2016 | Subramanian et al. | |
| 2017/0311187 A1* | 10/2017 | Dong | H04B 7/024 |
| 2017/0325241 A1 | 11/2017 | Toskala et al. | |
| 2019/0096262 A1* | 3/2019 | Dotzler | G08B 25/00 |
| 2020/0187201 A1* | 6/2020 | Jiang | H04W 72/0446 |

\* cited by examiner

TECHNIQUES FOR INTERFERENCE MANAGEMENT IN MILLIMETER WAVE COMMUNICATIONS SYSTEMS

CLAIM OF PRIORITY

The present Application for patent claims priority to U.S. Provisional Application No. 62/623,444, filed Jan. 29, 2018, assigned to the assignee of the present application and hereby expressly incorporated by reference herein in its entirety.

FIELD OF THE DISCLOSURE

Certain aspects of the present disclosure generally relate to wireless communications at a user equipment, and more specifically, to methods and apparatus for interference management in millimeter wave communications systems.

DESCRIPTION OF RELATED ART

Wireless communications systems are widely deployed to provide various types of communications content such as voice, video, packet data, messaging, broadcast, and so on. These systems may be capable of supporting communications with multiple users by sharing available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communications for multiple communications devices, which may otherwise be known as user equipment (UE).

Wireless communications systems may include or support networks used for vehicle based communications, also referred to as vehicle-to-everything (V2X) communications systems. V2X communications systems may be used by vehicles to increase safety and to help prevent collisions of vehicles. V2X communications systems may be configured to convey important information to a driver regarding inclement weather, nearby accidents, road conditions, and/or dangerous activities of nearby vehicles. V2X communications systems may also be used by autonomous vehicles (self-driving vehicles) and may provide extra information beyond the capability of a vehicle's existing system. The directional nature of beams (e.g., narrow beams) employed by some millimeter wave V2X communications systems may present challenges. These challenges may include interference in the millimeter wave V2X communications system. This could result int sub-optimal communication and even potential conflict between V2X communication systems. Described are methods for interference detection and management in V2X millimeter wave communications systems.

SUMMARY

A method of wireless communications at a user equipment (UE) is described. The method may include a second receiver detecting interference from a first directional transmission sent from a first receiver to a corresponding first transmitter on a first communication link, and the second receiver sending a message to a corresponding second transmitter to transmit a second directional transmission to the second receiver in an alternate timeslot. The method may include scheduling a system wide training interval in a transmission timeslot, suspending traffic transmissions on a link in the communications system during the training interval to perform training on the link, and resuming traffic transmissions on the link if interference is not detected during the training interval. The method may further include receiving at a node, unique parameters transmitted from another node in a communication system during a discovery stage, determining whether interference will occur at the node based on the received unique parameters, and suspending transmissions to and from the node if it is determined interference will occur at the node. The method may also include prior to establishing a new communication link between two nodes in the communications system, monitoring a communication channel for a period of time to determine whether a two-way communication link exists in the communication channel, and if there exists a two-way communication link, suspending transmissions between the two nodes until a later time.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.).

While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
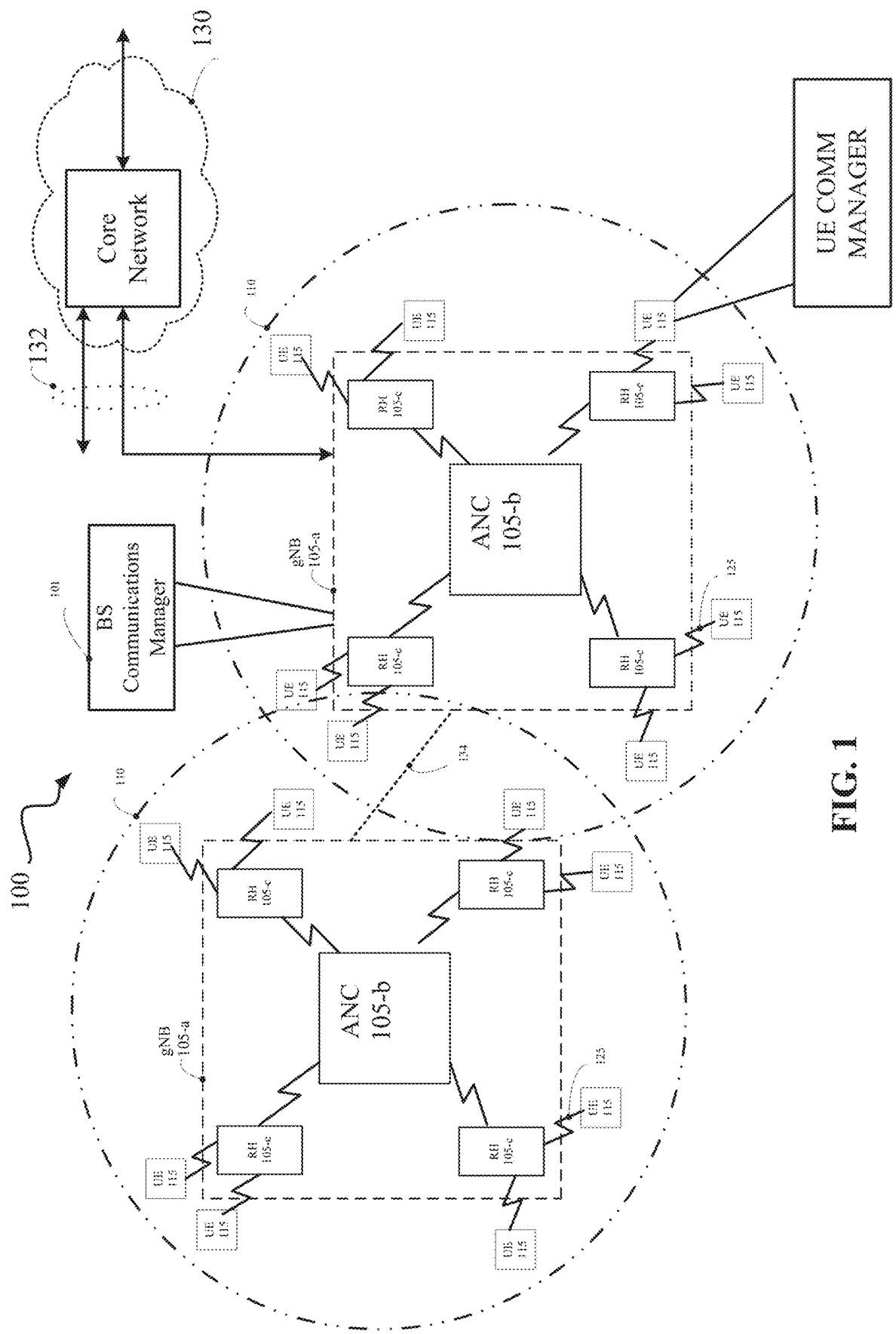
FIG. 1 illustrates an example of a system for wireless communications at a UE in the communications system that supports techniques for interference management in a millimeter wave communications system in accordance with one or more aspects of the present disclosure.

Aspects of the present disclosure provide apparatus, methods, processing systems, and computer readable mediums for interference management in communications systems. In certain aspects, a wireless communication device may use high carrier frequencies (e.g., millimeter wave (mmWave)) for communication. In aspects, the techniques may be used in multi-slice networks, such as NR (new radio access technology or 5G technology).

NR may support various wireless communication services, such as enhanced mobile broadband (eMBB) targeting wide bandwidth (e.g. 80 MHz beyond), millimeter wave (mmWave) targeting high carrier frequency (e.g. 24.25 GHz to 71 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Wireless communications systems may be used to facilitate communications between nodes in a communications system (e.g. between vehicles). Such communications may be referred to as V2X communications. V2X communications systems may operate in a millimeter wave (mmW) frequency spectrum band and may use directional beams to establish high-throughput communication links. Such high-throughput communications include for example, links between vehicles, to transport large amounts of data (e.g. camera feed, video streaming,), communications between high speed vehicles, use cases between vehicles requiring high data rates, vehicles in out-of-coverage areas, vehicles in high interference scenarios, etc. Methods for interference detection and management in a millimeter wave communications system are described herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

FIG. 1 illustrates an example of a wireless communications system 100 in accordance with one or more aspects of the present disclosure. The wireless communications system 100 includes base stations 105 (e.g., gNodeBs (gNBs), and/or radio heads (RHs)), or UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communications coverage for a respective geographic coverage area 110. Communications links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed. Distribution may be between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a user terminal, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communications device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communications (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communications between machines, i.e., Machine-to-Machine (M2M) communication. M2M or MTC may refer to data communications technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communications with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-*a* may include subcomponents such as an access network entity 105-*b*, which may be an example of an access node controller (ANC). Each access network entity 105-*b* may communicate with a number of UEs 115 through a number of other access network transmission entities 105-*c*, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more of network devices 105 may include a communications manager 101. In some deployments, the manager 101 may execute an interference management procedure in a V2X communications system. The interference management procedure severally aims to oversee interference that may arise in a communication network deployment. In some examples, an interference management procedure can include scheduling a system wide training interval in a transmission timeslot, suspending traffic transmissions on one or more links in the communications system during the training interval to perform training on the links, and resuming traffic transmissions on links that did not detect interference during the training interval. The interference management procedure may also include receiving at a node, unique parameters transmitted from another node in a communication system during a discovery stage, determining whether interference will occur at the node based on the received unique parameters, and suspending transmissions to and from the node if it is determined interference will occur at the node.

UEs 115 may include a communications manager 102. In some deployments, the manager 102 may execute an interference management procedure in a V2X communications system. The interference management procedure severally aims to oversee interference that may arise in a communications network deployment. In some examples, and interference management procedure can include scheduling a system wide training interval in a transmission timeslot, suspending traffic transmissions on links in the communications system during the training interval to perform training on the links, and resuming traffic transmissions on links that did not detect interference during the training interval. The interference management procedure may also include receiving at a node, unique parameters transmitted from another node in a communication system during a discovery stage, determining whether interference will occur at the node based on the received unique parameters, and suspending transmissions to and from the node if it is determined interference will occur at the node.

Wireless communications system 100 may operate in a variety of frequency ranges. For example, deployments may be via an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the UHF waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communications with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, antennas of a base station 105 or UE 115 may be located within one or more antenna arrays. The antennas may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 2:
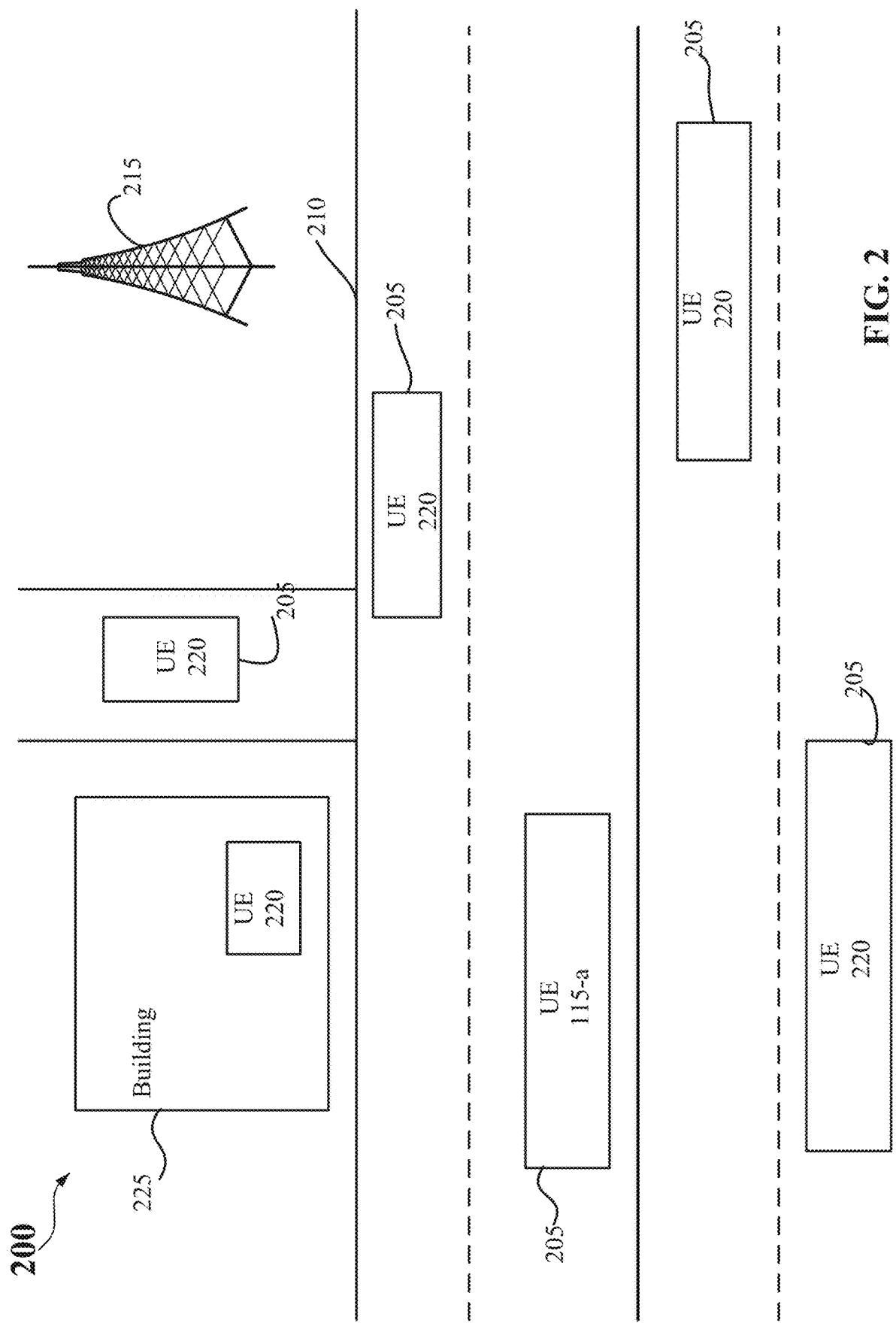
FIG. 2 illustrates an example of a V2X communications system that supports techniques for interference management in a millimeter wave communications system in accordance with one or more aspects of the present disclosure.

FIG. 2 illustrates an example of a V2X communications system 200 that supports techniques for interference management in a millimeter wave communications system in accordance with one or more aspects of the present disclosure. In some examples, the V2X communications system 200 may implement aspects of the wireless communications system 100.

The V2X communications system 200 may be configured to communicate information between vehicles 205 to any entity that may interact with the vehicle 205. Such V2X communications systems 200 may be implemented along roads 210 and other transportation through ways. The V2X communications system 200 may incorporate other types of communications systems including vehicle-to-infrastructure (V21) communications systems, vehicle-to-vehicle (V2V) communications systems, vehicle-to-pedestrian (V2P) communications systems, vehicle-to-device (V2D) communications systems, vehicle-to-grid (V2G) communications systems, or combinations thereof.

The V2X communications system 200 may include a number of base stations 215 and UEs 220. The base stations 215 may be configured to coordinate other types of communications in the V2X communications system 200 and to provide an access point for UEs of the V2X communications system 200 to access outside networks (e.g., the Internet). The base station 215 may be an example of the base stations 105 described with reference to FIG. 1. The base stations 215 and the UEs 220 may communicate using one or more communications links (not shown for clarity purposes). The communications links of the V2X communications system 200 may be examples of the communications links 125 described in FIG. 1.

The UEs 220 of the V2X communications system 200 may be associated with a number of different entities. Some UEs 220 may be integrated with a vehicle 205. Some UEs 220 may be integrated with buildings 225. Some UEs 220 may be integrated with other road side assistance applications. For example, signs, infrastructure, power systems, traffic control, safety management systems, flow control and other entities may include UEs 220 that communicate using the V2X communications system 200. The V2X communications system 200 may also connect UEs 220 associated with individuals. For example, UEs 220 (e.g., smartphones) associated with drivers, pedestrians, and/or other individuals may communicate using the V2X communications system 200. The UEs 220 may be examples of the UEs 115 described with reference to FIG. 1.

Figure 3:
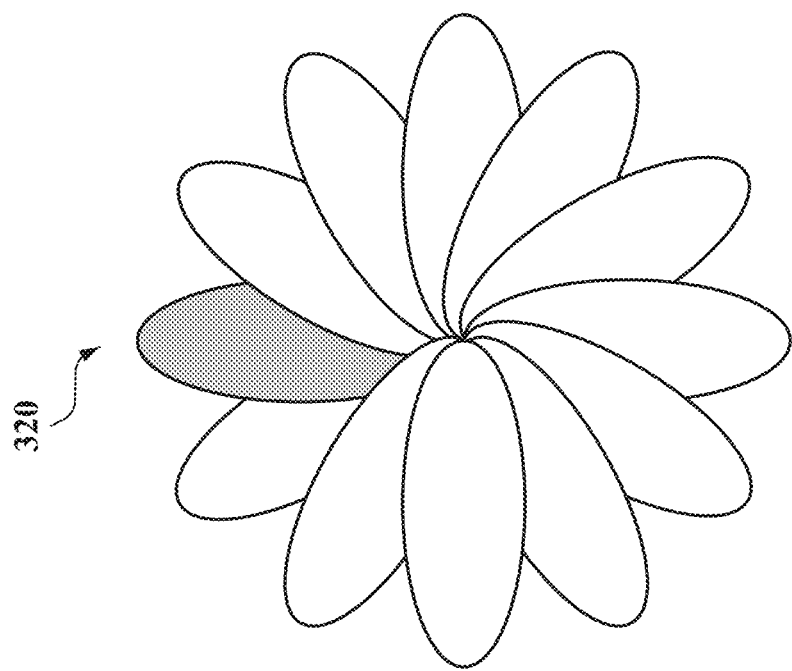
FIG. 3 illustrates examples of beam patterns in a millimeter wave communications system in accordance with one or more aspects of the present disclosure.
Figure 3:
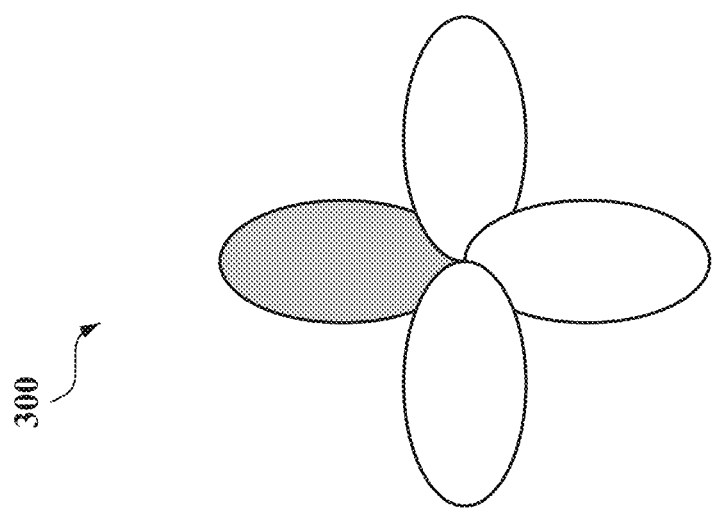

FIG. 3 illustrates two examples of beam patterns 300 and 320 that support techniques for interference management in a millimeter wave communications system in accordance with one or more aspects of the present disclosure. A beam may be defined by a frequency spectrum band, a beam target (e.g., beam direction), a beam width, beam range, or combinations thereof. The beam width for each directional wireless communications link may be different (e.g., beams from beam patterns 300 and 320). The beam width may be related to the size of the phased array antenna used to generate the directional wireless communications link. Different beam widths may be used by a UE (e.g. 115, 220) in different scenarios. For example, a first message may be transmitted/received using a directional wireless beam having a first beam width, while a second message may be transmitted/received using a directional wireless beam having a second beam width different than the first beam width. The range of mmW communications from beam patterns 300 and 320 depends on beam directivity. For example, beam pattern 300 may have coarse or wider beams compared to beam pattern 320, and has four beam directions. A smaller phased array antenna or fewer antenna elements are used to accomplish fewer beam directions. Beam pattern 300 may have a limited distance compared to beam pattern 320. Beam pattern 320 has narrower or finer beams and a beam direction of twelve. This is accomplished by using a larger phased array or more antenna elements. Beam pattern 320 may achieve longer distances than beam pattern 300. Energy consumption or power budget may determine the type of beam used in a millimeter wave communications system.

Figure 4:
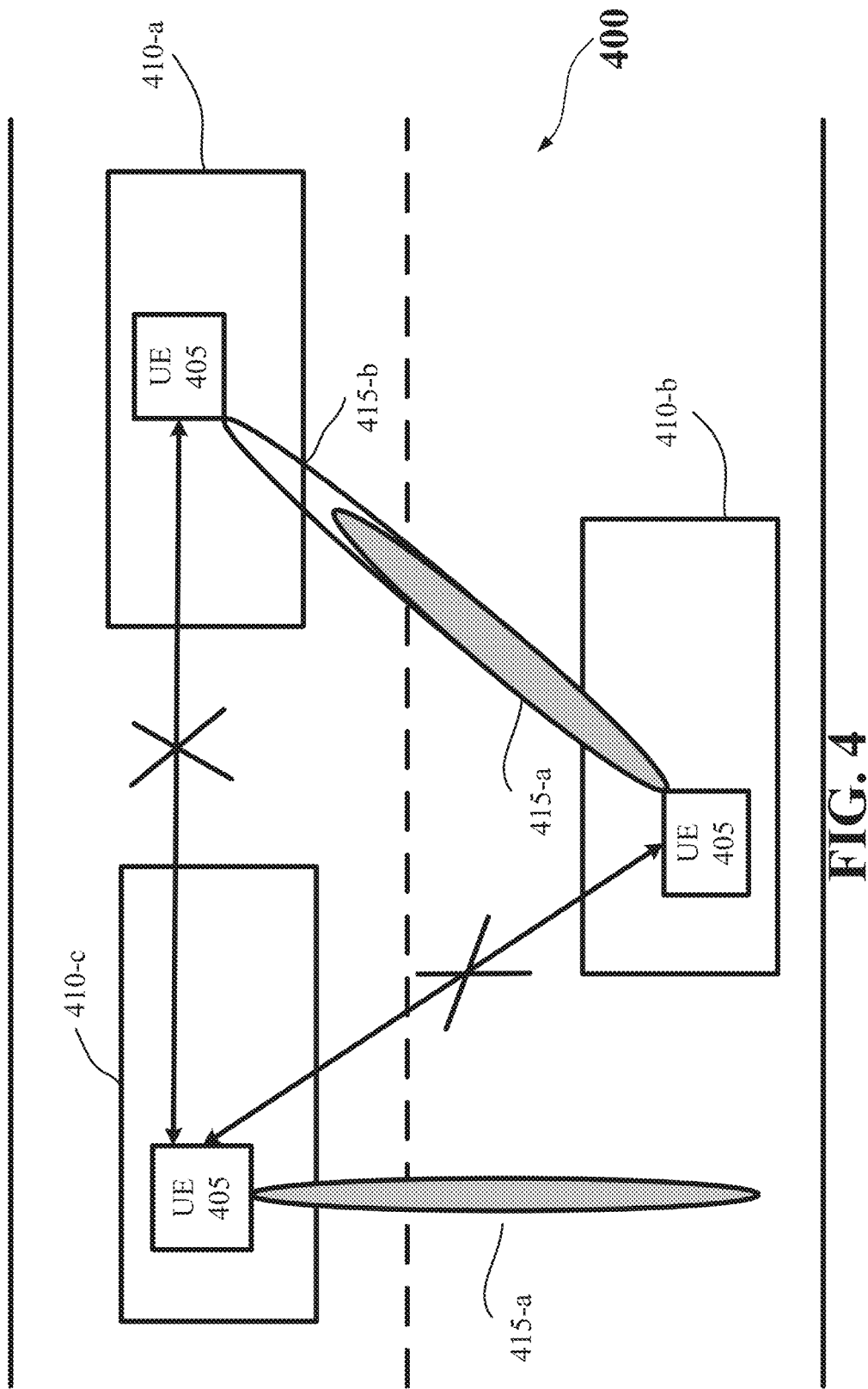
FIG. 4 illustrates an example of beam patterns in a millimeter wave communications system in accordance with one or more aspects of the present disclosure.

FIG. 4 illustrates an example of beam patterns in a millimeter wave communications system in accordance with one or more aspects of the present disclosure. In some examples, the V2X communications system 400 may implement aspects of the V2X communications system 200 and the wireless communications system 100. The V2X communications system 400 may facilitate communications between base stations (not shown) and UEs 405 and between UEs 405. The UEs 405 may be examples of the UEs 115 and 220 described with reference to FIGS. 1 and 2. The UEs 405 may be integrated as part of many different entities including vehicles 410, buildings, infrastructure, power grid, other devices, individuals, etc.

The V2X communications system 400 may use a millimeter wave frequency spectrum band to communicate data between UEs 405 of the V2X communications system 400. Communication links established using millimeter wave frequencies may be configured for high-throughput communications between UEs 405 and base stations. The V2X communications system 400 may be configured to use high-frequency spectrum bands and MIMO technologies, which may scale up the spectral efficiency considerably, to communicate information. Such high system throughput may be used for ever increasing demands of vehicle-based communications, such as sensor data sharing and massive content sharing between moving vehicles 410.

To establish communications in the V2X communications system 400 using a millimeter wave frequency spectrum band, one or more directional beams 415 (e.g., narrow beams) may be generated using beamforming techniques. The directional beams 415-a/415-b may be pointed in a specific direction and provide high-bandwidth links between UEs 405. Signal processing techniques, such as beamforming, may be used to coherently combine energy and thereby form the directional wireless communications links. Wireless communications links achieved through beamforming may be associated with narrow beams (e.g., "pencil beams") that are highly directional and provide high-bandwidth links between wireless nodes (e.g., base stations, access nodes, UEs etc.). The V2X communications system 400 may operate in millimeter wave (mmW) frequency ranges, e.g., 28 GHz, 40 GHz, 60 GHz, etc. In some examples, directional wireless communications links are transmitted using frequencies greater than 6 GHz. Wireless communications at these frequencies may be associated with increased signal attenuation, e.g., path loss, which may be influenced by various factors, such as temperature, barometric pressure, diffraction, etc. Dynamic beam-steering and beam-search capabilities may further support, for example, discovery, link establishment, and beam refinement in the presence of dynamic shadowing and Rayleigh fading. Additionally, communications in such mmW systems may be time division multiplexed, where a transmission may only be directed to one wireless device at a time due to the directionality of the transmitted signal.

UE 405 or a base station may generate any number of directional wireless communications links. The directional beams 415 generated by UEs 405 may be pointed at any geographic location. In FIG. 4, directional beams 415-a illustrate directional beamforming used to transmit signals. Directional beams 415 may refer to directional listening employed by some UEs 405. Using beamforming, a UE 405 may be configured to select a plurality of beamforming parameters of an antenna to receive a directional signal transmitted by a transmitting device. A UE 405 may use many of the same techniques for directional listening as is used for directional transmissions. In FIG. 4, directional beam 415-b illustrates directional beamforming used to listen for transmitted signals.

Based on the alignment of transmission of directional beams 415-a and reception of directional beam 415-b, a UE 405 of a first vehicle 410-a has established a communications link with a UE 405 of a second vehicle 410-b. By using directional transmissions and directional listening, the data transmitted over the communications link may not interfere with the communications of a UE 405 of a third vehicle 410-c. For example, the UE 405 of the third vehicle 410-c has not established a communications link with the UE 405 of either the first vehicle 410-a or the second vehicle 410-b.

Figure 5:
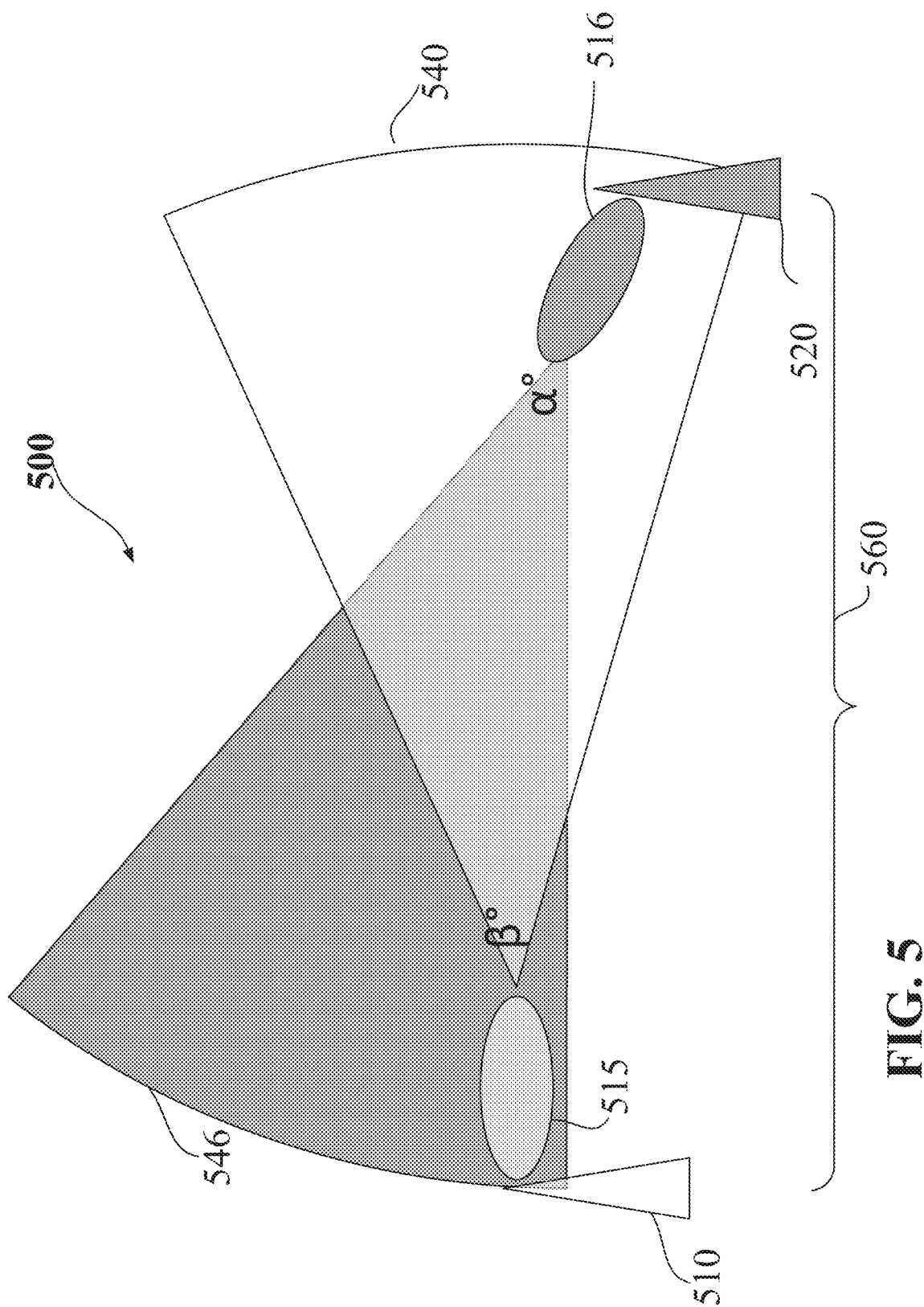
FIG. 5 illustrates another example of beam patterns and corresponding interference in a millimeter wave V2X communications system.

FIG. 5 illustrates an example of beam patterns and corresponding interference in a millimeter wave V2X communications system. To establish communications in a V2X communications system using a millimeter wave frequency spectrum band, a device, e.g. receiver/transmitter 510 may be configured to transmit directional beam 515 with an aperture 540. Aperture also known as effective area, is the area oriented perpendicular to the direction of an incoming beam which would intercept the same amount of power from that wave as is produced by the antenna receiving it. In some aspects path loss between a transmitter and a receiver may not change as a function of frequency as long as the effective aperture of transmitting and receiving antennas does not change. A second device, e.g. receiver/transmitter 520 may be configured to transmit directional beam 516 with an aperture 546. Receiver/transmitter 510 may see receiver/transmitter 520 as an interfering device when directional beams 516 are transmitted. For example, receiver/transmitter 520 may transmit directional beam 516 at a certain angle "$\alpha$" and receiver/transmitter 510 may transmit beam 515 at a certain angle "$\beta$". If receiver/transmitter 520 is within angle $\alpha$ of receiver/transmitter 510, and receiver/transmitter 510 is within angle $\beta$ of interferer 520, assuming a is equal to $\beta$, and both receiver/transmitter 510 and receiver/transmitter 520 are a certain distance R 560 apart, interference will occur at receiver/transmitter 510. The distance R 560 may be referred to as the interference range of receiver/transmitter 510 and receiver/transmitter 520. In another example, angle $\alpha$ may not be equal to angle $\beta$.

Figure 6:
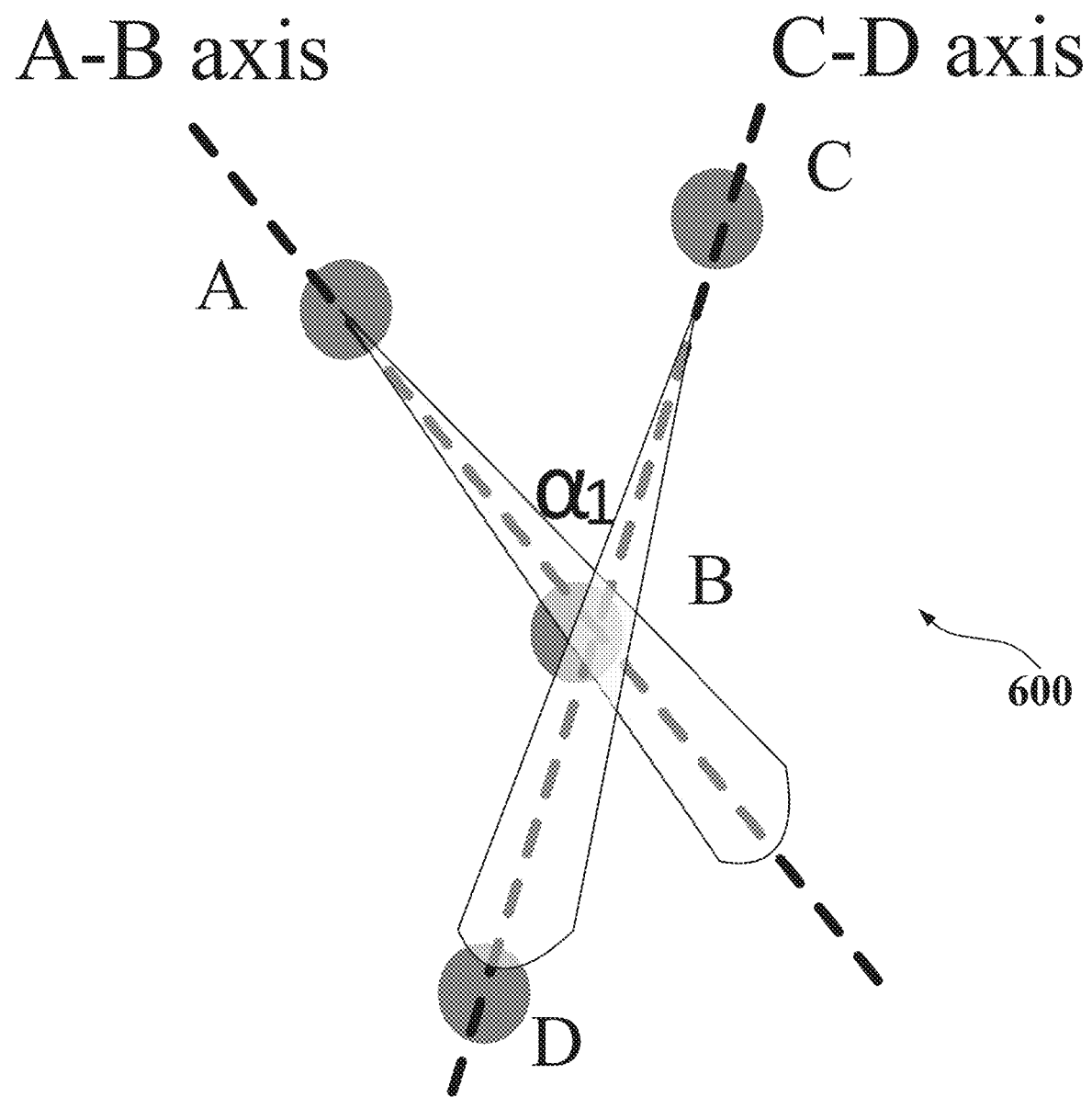
FIG. 6 illustrates yet another example of beam patterns and corresponding interference in a millimeter wave V2X communications system.

FIG. 6 further illustrates an example of beam patterns and corresponding interference 600 in a millimeter wave V2X communications system. In order to establish a millimeter wave communications link from a transmitter, e.g. node A to a receiver, e.g. node B, node A may transmit a directional beam to Node B at a specific aperture. For purposes of illustration, the communications link between node A and node B may be referred to as link AB. Similarly, node C may transmit a directional beam to node D at a specific aperture to establish communications link CD. In some examples, links AB and CD may be established independently or may occur concurrently. For example, communications link AB my occur in a timeslot also allocated to traffic transmissions on communications link CD. When this occurs, node B may perceive interference from node C transmissions.

In the example of FIG. 6, assuming communication link AB was first established, node B may be referred to as a victim node and Node C may be referred to as an aggressor node. If Node B receives interference at angle $\alpha_1$, and assuming the same transmit and receive pattern is used at each node, then transmissions from node B will also diverge at angle al to cause interference at node C. The interference caused at node B by node C and received at node C from node B may be referred to as reciprocal interference. In another aspect of this example, node A may not be aware of interference at its receiving node, node B, that is caused by aggressor node, node C. Furthermore, assuming node B generates a directional beam targeting node A with an aperture angle $α_1$, then, energy from node B will leak to node C at the same angle $α_1$. If node D transmits a directional beam back to node C on communications link CD with aperture angle $α_1$, then node C receives two beams, a direct beam from node D to node C and a leaked beam from node B.

As illustrated by the example of FIG. 6, when independent scheduling decisions are made by individual nodes or users or UEs in a V2X millimeter communications system 400 associated with highly directional beams (e.g. pencil beams), unwanted interference may result. This may cause system-wide conflict. Methods and techniques to detect and manage interference caused by directional beams in V2X millimeter communications systems are presented herein. In some examples, a victim receiver e.g node B which suffers interference may transmit a message to its transmitter e.g node A to re-schedule transmissions. In FIG. 6, victim node B may transmit a message to node A to re-schedule a transmission in a timeslot different from the originally scheduled timeslot.

Figure 7A:
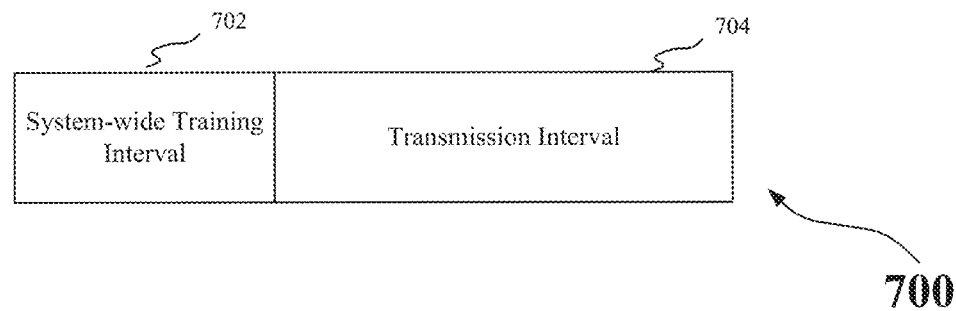
FIG. 7A illustrates an example technique for interference management in a millimeter wave communications system in accordance with one or more aspects of the present disclosure.

FIG. 7A illustrates an example technique 700 for interference management in a millimeter wave communications system in accordance with one or more aspects of the present disclosure. In some examples, a system-wide training interval 702 may be defined for a millimeter wave communications system. The system-wide training interval 702 may correspond to a timeslot or period of time allocated to beam training (e.g. in the V2X communications system). In some examples, a receiving device may determine spatial directions in which each transmitting device may transmit. The receiving device may then select a sweeping pattern for receiving transmissions from transmitting devices. In some examples, receiving and transmitting devices may perform beam training during a beam training phase which may correspond to a beamforming training interval of an 802.11ad beacon interval structure.

In one example, as illustrated in FIG. 7A, a system-wide training interval 702 may be defined based on transmission timing. For example, at a time t, allocated to system-wide beam training, a transmitter (e.g. node A) may suspend its traffic transmission and perform beam training from time t to time t+n, or for the duration of the allocated system-wide training interval. Other transmitters in the communications system may also perform beam training in the allocated time. Referring to the communications system illustrated in FIG. 6 for example, if a receiver (e.g., node B) sees strong interference from another node (e.g. node C) during a system-wide training interval, the receiver (node B) may suspend traffic transmissions (e.g., transmissions back to node A) for a period of time since transmissions back to node A would cause interference to Node C. For example, node B may suspend traffic transmissions until a transmission interval 704, or until a transmission interval that does not cause interference to other transmission nodes. In another aspect of disclosed examples, links may use a pseudo-random sequence for beam training. In another aspect of disclosed examples, a system-wide training interval may be pre-configured. In another aspect of disclosed examples, a system-wide training interval may be predetermined. In yet another aspect, the system-wide training interval may be provided by or transmitted by an eNodeB of a serving cell in RRC.

Figure 7B:
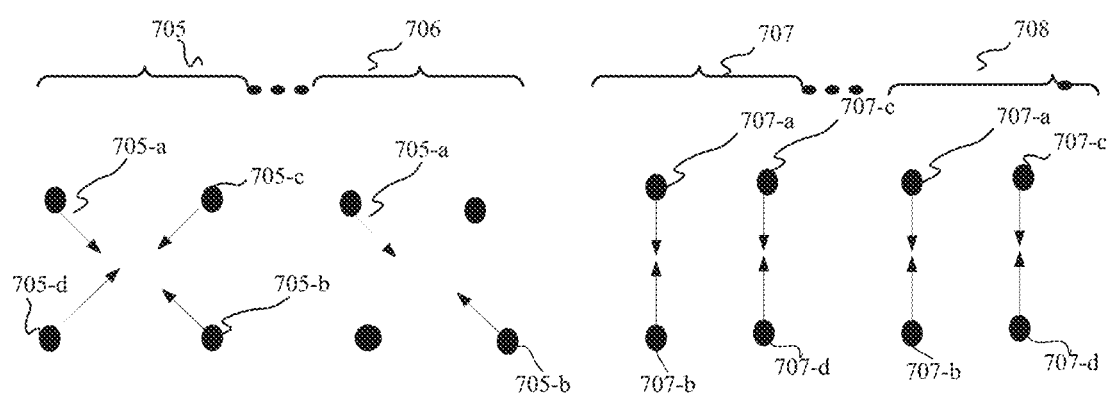
FIG. 7B illustrates an example technique for interference management in a millimeter wave communications system in accordance with one or more aspects of the present disclosure.

FIG. 7B illustrates an example technique for interference management in a millimeter wave communications system in accordance with one or more aspects of the present disclosure. In some examples, a discovery stage may be defined for a millimeter wave communications system. A discovery stage may refer to a timeslot or a discovery slot 705/707 in a communications link, in which each node in a V2X communications system (e.g., nodes A, B, C and D of FIG. 6) announces unique parameters about the node.

In one example, as illustrated in FIG. 7B, in discovery slot 705, each node in a communications system may announce unique parameters such as its direction, location, relevant traffic slots, geometry, etc. For example, in discovery slot 705 nodes 705-a, 705-b, 705-c and 705-d may announce their direction location and relevant traffic slots. As illustrated, Nodes 705-a and 705-b may announce an intention to establish a communications link between each other, and nodes 705-c and 705-d may announce an intention to establish a communication link between each other as well. The intention to establish a communications link may be based on the announced direction, location, relevant traffic slots, etc. In one example, nodes 705-c and 705-d may determine not to transmit (or not to establish a communication link) in a subsequent transmission slot 706, based on parameters transmitted by the nodes in discovery slot 705. Similarly, nodes 705-a and 705-b may determine to proceed with transmission. In one example, nodes 705-a and 705-b may have already been transmitting on an established communication link and nodes 705-c and 705-d may be trying to establish a brand new communications link between them. In another example, a node may use geometry information it receives to calculate whether a transmission from another node will cause interference to it.

In some examples, it may be determined that there is no conflict between nodes based on unique parameters announced by each node during a discovery slot. For example, as illustrated in FIG. 7B, in discovery slot 707, each node 707-a, 707-b, 707-c and 707-d may announce unique parameters such as its direction, location, relevant traffic slots, geometry, etc. As illustrated, nodes 707-a and 707-b may announce an intention to establish a communications link between them, and Nodes 707-c and 707-d may announce an intention to establish a communications link between them. Here, if no conflict is determined, e.g., based on the unique parameters announced, all nodes may decide to establish communication links in a subsequent transmission slot 708.

Other examples also illustrate techniques for interference management in a millimeter wave communications system in accordance with one or more aspects of the present disclosure. For instance, before a transmission slot is selected on a new communications link, both transmit and receive nodes (e.g., nodes C, D of FIG. 6) may monitor communications channels in a V2X communications system for a period of time, T. If it is determined another communications link (e.g., link AB) has already been established and the traffic on that communication link is not completely one-way, then the monitoring nodes may determine not to establish a new communication link between them. For example, referring to FIG. 6, prior to establishing new communications link CD, both nodes C and D may monitor the communication channel for a time T If two-way traffic is detected on communications link AB from node A to node B and from node B to node A, then nodes C and D might determine not to establish communications link CD. In another aspect, if nodes C and D detect one-way traffic only, on communications link AB, then nodes C and D may establish communication linke CD without reciprocal interference from node B to node C.

Yet other examples illustrate techniques for interference management in a millimeter wave communications system in accordance with one or more aspects of the present disclosure. For instance, reciprocal interference may be heard at a node when traffic (e.g., data) and ACK (acknowledgment) transmissions occur on a communications link between two other nodes. Referring to FIG. 6 for instance, an ACK signal or transmission may be sent from node B to node A to acknowledge successful receipt of a transmission from node A. In an aspect of present examples, the ACK signal may use the same narrow beam structure in the reverse direction. This ACK signal or transmission may cause interference at node C. In another aspect of present examples, transmissions (e.g., data) and ACK signals sent between transmit and receive nodes (e.g., between nodes A and B) may occur in the same subframe.

Figure 8:
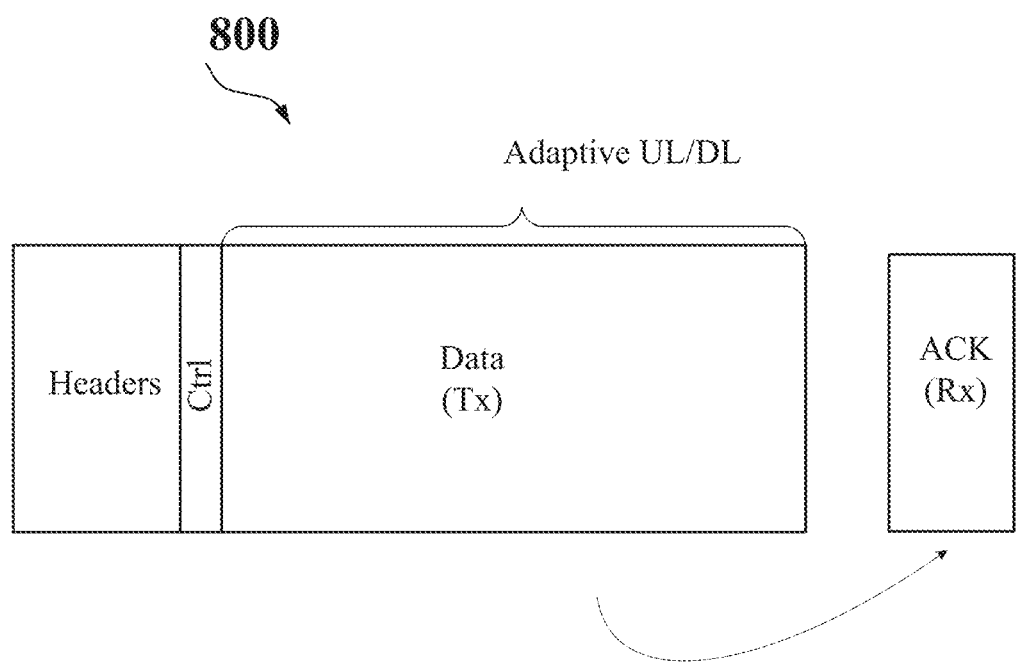
FIG. 8 illustrates an example frame structure that supports techniques for interference management in a millimeter wave communications system in accordance with one or more aspects of the present disclosure.

FIG. 8, illustrates a 5G subframe 800, whereby, for example, on a TDD downlink centric subframe, data is transmitted from the network to a UE 115 and an ACK is sent back to the network 105 on the same subframe. In some examples, interference caused by the ACK signal or transmission may be detected instantly at node C. In this case, node C may optimally update its MAC schedule based on immediate receipt of interference due to the ACK and may determine not to utilize a system-wide training interval or a discovery slot to detect and manage interference. Disclosed examples may be supported in sidelink communications as well as uplink and downlink communications.

Figure 9:
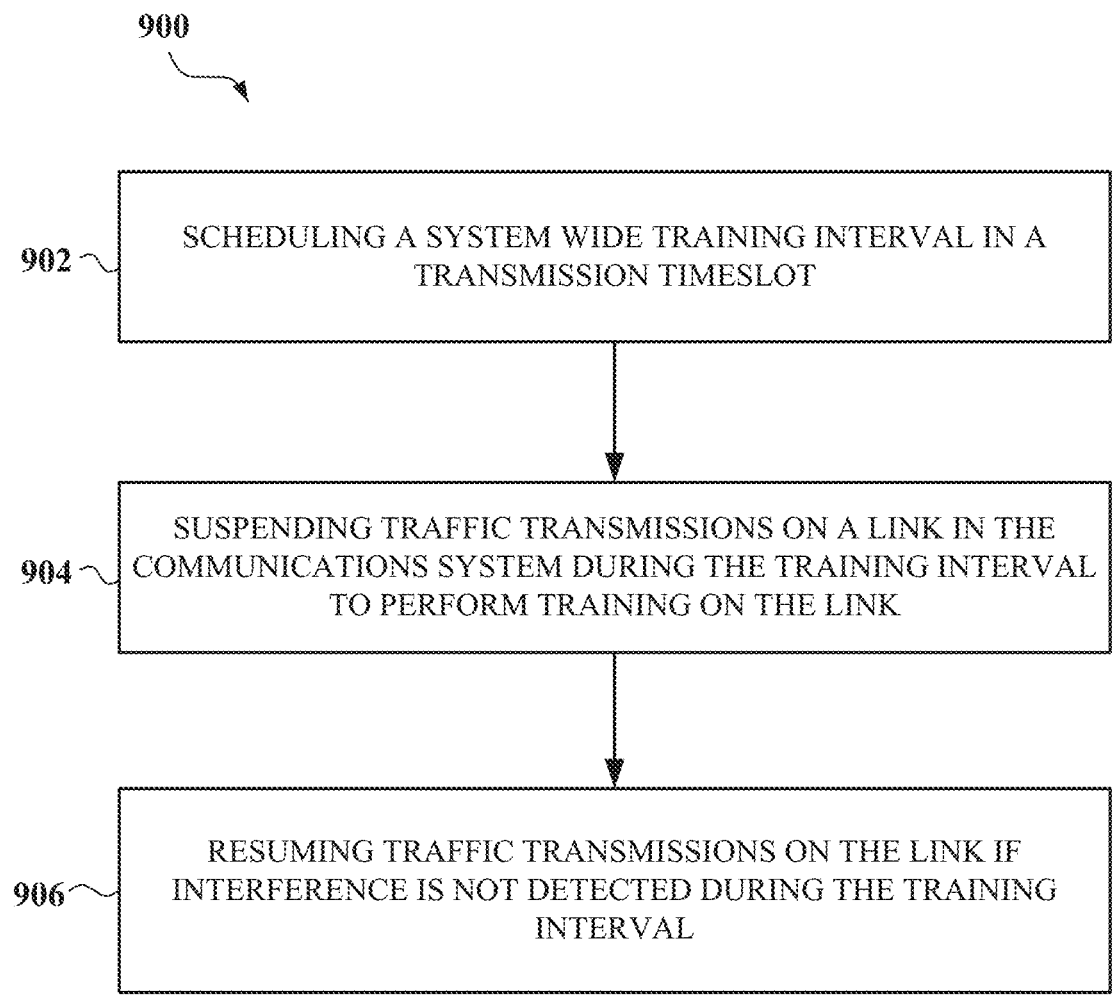
FIG. 9 illustrates an example flowchart of techniques for interference management in a millimeter wave communications system in accordance with one or more aspects of the present disclosure.

FIG. 9 illustrates an example flowchart of a communications scheme 900 that supports techniques for interference management in a millimeter wave communications system in accordance with one or more aspects of the present disclosure. In some examples, the communications scheme 900 may implement aspects of the V2X communications systems 200 and 300 and the wireless communications system 100. At block 902 a first V2X communication system device 902 may schedule a system-wide training interval in a transmission timeslot. At block 904 the device may suspend traffic transmissions on a link in the communications system during the training interval to perform training on the link. At block 906, the device may resume traffic transmissions on the link if it did not detect interference during the training interval.

Figure 10:
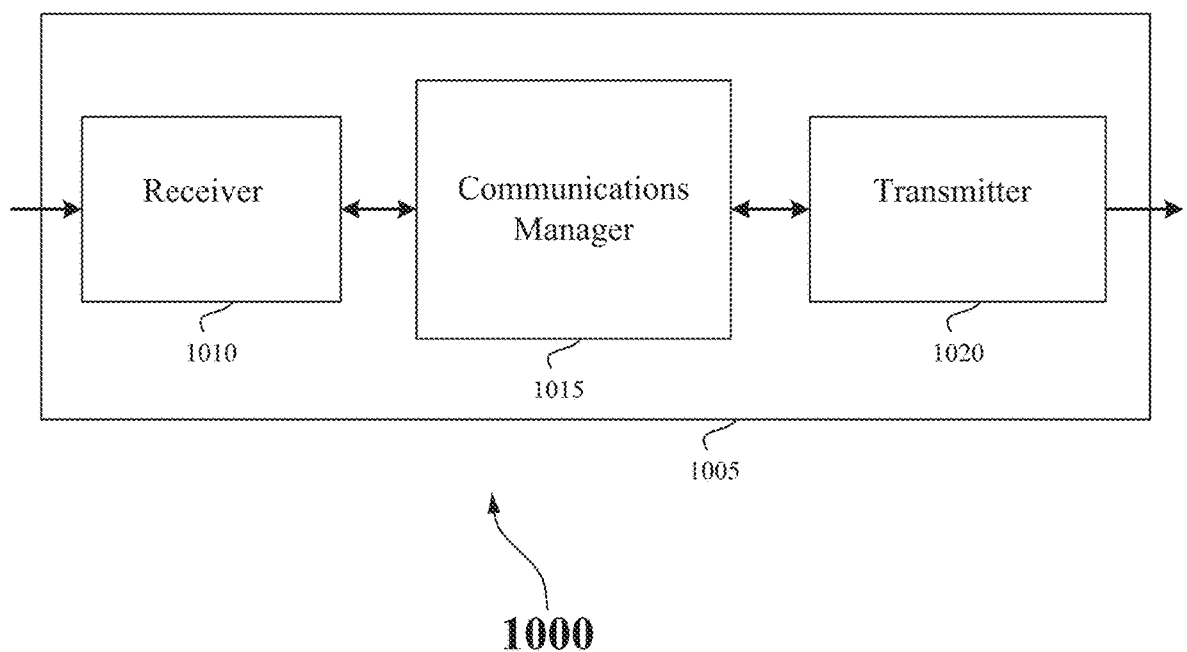
FIG. 10 illustrates a block diagram of an example device that supports techniques for interference management in a millimeter wave communications system in accordance with one or more aspects of the present disclosure.

FIG. 10 shows a block diagram 1000 of a wireless device 1005 that supports techniques for interference management in a millimeter wave communications system in accordance with one or more aspects of the present disclosure and may be deployed to carry out various of the methods described in this disclosure. Wireless device 1005 may be an example of aspects of a UE 115 as described herein. Wireless device 1005 may include receiver 1010, communications manager 1015, and transmitter 1020. Wireless device 1005 may also include a processor. Each of these components may be in communications with one another (e.g., via one or more buses).

Receiver 1010 may receive information via a communication interface such as packets, user data, or control information associated with various information channels (e.g., control channels, data channels, and information related to techniques for interference management in a millimeter wave communications system, etc.). Information may be passed on to other components of the device. The receiver 1010 may be an example of aspects of the transceiver 1135 described with reference to FIG. 11. The receiver 1010 may utilize a single antenna or a set of antennas.

Communications manager 1015 may be an example of aspects of the communications manager 1115 described with reference to FIG. 11.

Communications manager 1015 and/or at least some of its various sub-components may be implemented in hardware, software executed by a processor, firmware, or any combination thereof. If implemented in software executed by a processor, the functions of the communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1015 and/or at least some of its various sub-components may be physically located at various positions, including being distributed such that portions of functions are implemented at different physical locations by one or more physical devices. In some examples, communications manager 1015 and/or at least some of its various sub-components may be a separate and distinct component in accordance with one or more aspects of the present disclosure. In other examples, communications manager 1015 and/or at least some of its various sub-components may be combined with one or more other hardware components, including but not limited to an I/O component, a transceiver, a network server, another computing device, one or more other components described in the present disclosure, or a combination thereof in accordance with one or more aspects of the present disclosure.

Communications manager 1015 may operate as a transmit device during a time period of an interference management procedure for a V2X communications system. The interference management procedure can be configured to detect interference from a first directional transmission sent from a first receiver to a corresponding first transmitter on a first communication link. The second receiver can send a message to a corresponding second transmitter to transmit a second directional transmission to the second receiver in an alternate timeslot. The interference management procedure may also include scheduling a system wide training interval in a transmission timeslot, suspending traffic transmissions on links in the communications system during the training interval to perform training on the links, and resuming traffic transmissions on links that did not detect interference during the training interval. The interference management procedure may also include receiving at a node, unique parameters transmitted from another node in a communication system during a discovery stage, determining whether interference will occur at the node based on the received unique parameters, and suspending transmissions to and from the node if it is determined interference will occur at the node.

The communications manager 1015 may also operate as a receive device during a time period of an interference management procedure for a V2X communications system. The beam discovery procedure can be configured to schedule a system wide training interval in a transmission timeslot, suspend traffic transmissions on links in the communications system during the training interval to perform training on the links, and resume traffic transmissions on links that did not detect interference during the training interval. The interference management procedure may also include receiving at a node, unique parameters transmitted from another node in a communication system during a discovery stage, determining whether interference will occur at the node based on the received unique parameters, and suspending transmissions to and from the node if it is determined interference will occur at the node.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1135 described with reference to FIG. 1. The transmitter 1020 may utilize a single antenna or a set of antennas.

Figure 11:
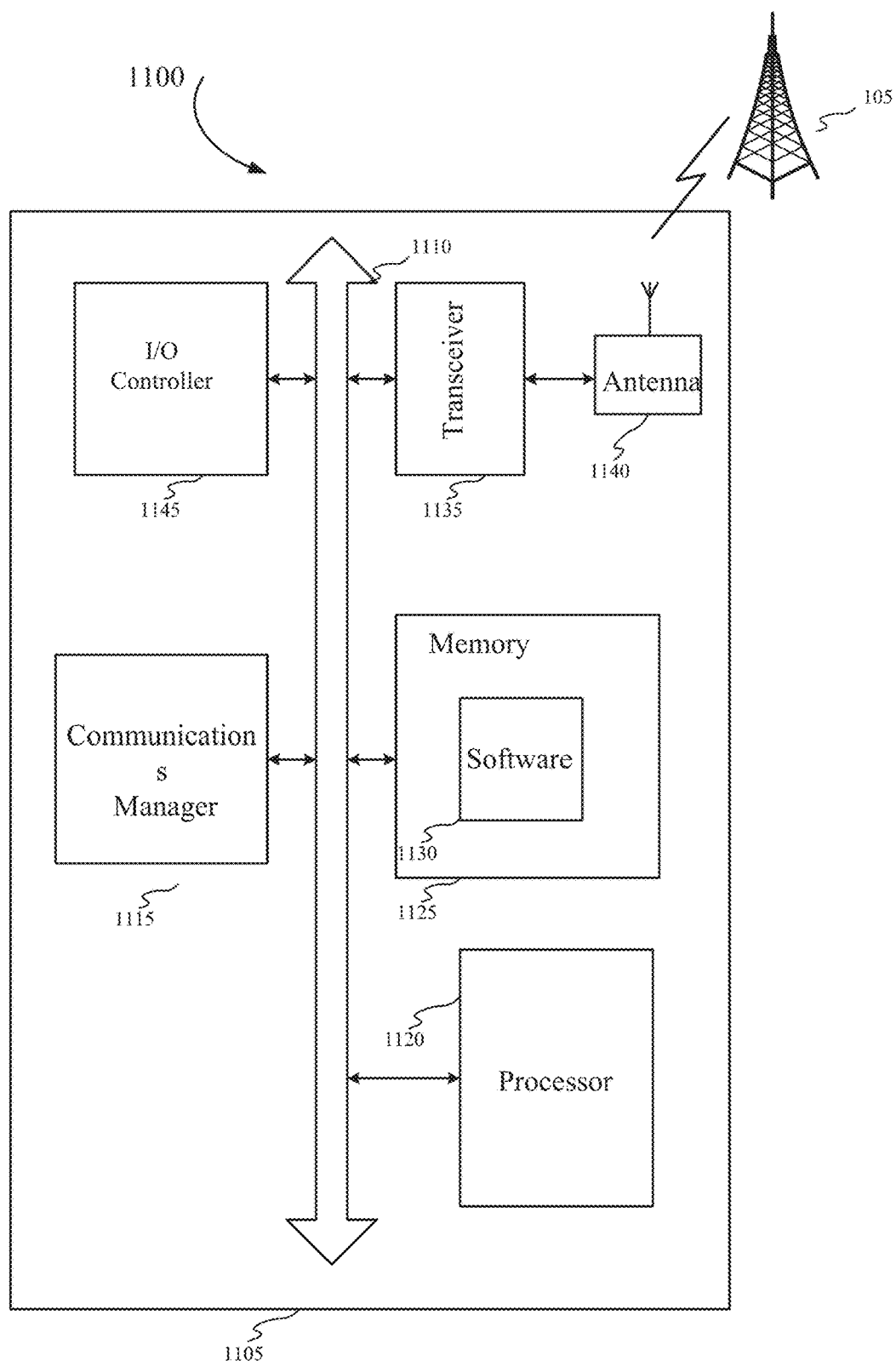
FIG. 11 illustrates a block diagram of an example system that supports techniques for interference management in a millimeter wave communications system in accordance with one or more aspects of the present disclosure.

FIG. 11 shows a diagram of a system 1100 including a device 1105 that supports techniques for interference management in a millimeter wave communications system in accordance with one or more aspects of the present disclosure. Device 1105 may be an example of or include the components of wireless device 1005, illustrated in FIG. 10. Device 1105 may include components for bi-directional voice and data communications including components for transmitting and receiving communications, including communications manager 1115, processor 1120, memory 1125, software 1130, transceiver 1135, antenna 1140, and I/O controller 1145. These components may be in electronic communications via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for interference management in millimeter wave communications system).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support techniques for interference management in millimeter wave communications systems. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communications coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communications link described herein—including, for example, wireless communications systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 115 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a first user equipment (UE) at a first vehicle in a vehicle-to-everything (V2X) wireless communication system, comprising:
   receiving, by the first UE at the first vehicle configured to communicate with a second UE at a second vehicle using a first directional communication link, a set of unique parameters for communications associated with a third UE at a third vehicle configured to communicate using a second directional communication link, wherein the first, second, and third UEs belong to the V2X wireless communication system;
   determining, by the first UE at the first vehicle configured to communicate with the second UE at the second vehicle using the first directional communication link and during a system-wide training interval for the V2X wireless communication system, interference from at least the third UE at the third vehicle based at least in part on the set of unique parameters for communications associated with the third UE, wherein the first, second, and third UEs are configured to perform independent scheduling decisions for directional communications with UEs of the V2X wireless communication system; and
   transmitting, to the second UE, the third UE, or both, one or more messages for rescheduling, by the second UE, one or more future transmissions that were previously scheduled on the first directional communication link or for rescheduling, by the third UE, the one or more future transmissions that were previously scheduled on the second directional communication link, or both based at least in part on determining the interference.

2. The method of claim 1, wherein the system-wide training interval for the V2X wireless communication system is scheduled in a transmission timeslot previously allotted to traffic transmissions by one or more of the UEs of the V2X wireless communication system.

3. The method of claim 2, wherein training is performed during the system-wide training interval using a pseudo-random sequence of directional communication links.

4. The method of claim 2, wherein the system-wide training interval is pre-configured in one or more UEs of the V2X wireless communication system including the first UE.

5. The method of claim 2, further comprising:
receiving the system-wide training interval from a base station of a serving cell in the V2X wireless communication system.

6. The method of claim 1, further comprising:
receiving the set of unique parameters during a discovery stage, wherein the set of unique parameters comprises one or more of a direction, a location, traffic slots, or a geometry of the second directional communication link.

7. The method of claim 1, wherein determining interference by the first UE is based at least in part on information associated with the first directional communication link and the second directional communication link, the information comprising one or more of beam direction, beam location, or one or more semi-persistent traffic slots of the first directional communication link and the second directional communication link.

8. The method of claim 1, wherein the directional communications are based at least in part on one or more of peer-to-peer (P2P), device-to-device (D2D), or V2X communications protocols.

9. The method of claim 1, further comprising:
monitoring a communication channel for a period of time to determine if a two-way communication link associated with the second directional communication link exists in the communication channel; and
determining the interference based at least in part on monitoring the communication channel.

10. The method of claim 1, wherein:
determining interference by the first UE is based at least in part on detecting an acknowledgment (ACK) transmission associated with the second directional communication link; and
the rescheduling comprises updating a transmission schedule for the first UE based at least in part on the determined interference.

11. An apparatus for wireless communication at a first user equipment (UE) at a first vehicle in a vehicle-to-everything (V2X) wireless communication system, the apparatus comprising:
a processor;
a memory coupled to the processor; and
instructions stored in the memory and executed by the processor to cause the apparatus to:
receive, by the first UE at the first vehicle configured to communicate with a second UE at a second vehicle using a first directional communication link, a set of unique parameters for communications associated with a third UE at a third vehicle configured to communicate using a second directional communication link, wherein the first, second, and third UEs belong to the V2X wireless communication system;
determine, by the first UE at the first vehicle configured to communicate with the second UE at the second vehicle using the first directional communication link and during a system-wide training interval for the V2X wireless communication system, interference from at least the third UE at the third vehicle based at least in part on the set of unique parameters for communications associated with the third UE wherein the first, second, and third UEs are configured to perform independent scheduling decisions for directional communications with UEs of the V2X wireless communication system; and
transmit, to the second UE, the third UE, or both, one or more messages for rescheduling, by the second UE, one or more future transmissions that were previously scheduled on the first directional communication link or for rescheduling, by the third UE, the one or more future transmissions that were previously scheduled on the second directional communication link, or both based at least in part on determining the interference.

12. The apparatus of claim 11, wherein the system-wide training interval for the V2X wireless communication system, is scheduled in a transmission timeslot previously allotted to traffic transmissions by one or more of the UEs of the V2X wireless communication system.

13. The apparatus of claim 12, wherein training is performed during the system-wide training interval using a pseudo-random sequence of directional communication links.

14. The apparatus of claim 12, wherein the system-wide training interval is pre-configured in one or more UEs of the V2X wireless communication system including the first UE.

15. The apparatus of claim 12, wherein the instructions are further executable by the processor to cause the apparatus to:
receive the system-wide training interval from a base station of a serving cell in the V2X wireless communication system.

16. The apparatus of claim 11, wherein the instructions are further executable by the processor to cause the apparatus to:
receive the set of unique parameters during a discovery stage, wherein the set of unique parameters comprises one or more of a direction, a location, traffic slots, or a geometry of the second directional communication link.

17. The apparatus of claim 11, wherein determining interference by the first UE is based at least in part on information associated with the first directional communication link and the second directional communication link, the information comprising one or more of beam direction, beam location, or one or more semi-persistent traffic slots of the first directional communication link and the second directional communication link.

18. The apparatus of claim 11, wherein the directional communications are based at least in part on one or more of peer-to-peer (P2P), device-to-device (D2D), or V2X communications protocols.

19. The apparatus of claim 11, wherein the instructions are further executable by the processor to cause the apparatus to:
monitor a communication channel for a period of time to determine if a two-way communication link associated with the second directional communication link exists in the communication channel; and
determine the interference based at least in part on monitoring the communication channel.

20. The apparatus of claim 11, wherein:
determining interference by the first UE is based at least in part on detecting an acknowledgment (ACK) transmission associated with the second directional communication link; and
the rescheduling comprises updating a transmission schedule for the first UE based at least in part on the determined interference.

21. The apparatus of claim 11, wherein the one or more future transmissions comprise one or more transmissions from one or more of the first UE, the second UE, or the third UE.

22. The apparatus of claim 11, wherein the rescheduling comprises:

transmitting the one or more of the one or more future transmissions on respective one or more timeslots which are different from corresponding one or more timeslots in which the one or more future transmissions were previously scheduled.

23. The method of claim 1, wherein the one or more future transmissions comprise one or more transmissions from one or more of the first UE, the second UE, or the third UE.

24. The method of claim 1, wherein the rescheduling comprises:
transmitting the one or more of the one or more future transmissions on respective one or more timeslots which are different from corresponding one or more timeslots in which theone or more future transmissions were previously scheduled.

\* \* \* \* \*